United States Patent Office

2,846,467
Patented Aug. 5, 1958

2,846,467

DICYCLODIENE ACIDS

Herbert K. Wiese, Cranford, N. J., assignor to Esso Research and Engineering Company, a corporation of Delaware No Drawing. Application June 13, 1955
Serial No. 515,255

11 Claims. (Cl. 260—514)

This invention relates to an improved process for making dicyclodiene dicarboxylic acids, such as dicyclopentadiene-3,7-dicarboxylic acid, a more recently indicated configuration being shown in U. S. Patent No. 2,818,430, granted December 31, 1957.

Dicyclodiene dicarboxylic acids are well known materials. The best method heretofore available for their preparation is described, for instance, in application Serial No. 401,437, filed December 30, 1953, now U. S. Patent No. 2,781,397, of which the present application is a continuation-in-part. In order to avoid repetition, the entire disclosure of the former application is hereby incorporated herein by reference. By way of summary, it is sufficient to indicate that the previously described method involves in essence, first, the reaction of finely divided metallic sodium with monomeric cyclodiene such as cyclopentadiene in the presence of an inert diluent such as xylene and a small amount of an activator such as anhydrous alcohol; second, the conversion of the resulting cyclodienyl sodium to the disodium salt of dicyclopentadiene dicarboxylic acid by treatment of the xylene solution with an excess of carbon dioxide; third, the addition of water to form an aqueous solution of disodium salt under inherently alkaline conditions; fourth, the separation of the aqueous solution from the hydrocarbon phase, and lastly, the acidification of the aqueous solution with sulfuric or other strong mineral acid to spring and precipitate the free dicyclodiene dicarboxylic acid product from the solution. Instead of sodium, it is possible to use potassium metal in the preparation of the cyclodienyl salt, although the resulting potassium compound has the disadvantage of tending to ignite rather readily upon exposure to air.

The resulting dicarboxylic acids have been attracting increasing interest in connection with a variety of uses. For instance, alkyl esters of either the dicyclodiene acids or of the hydrogenated acids derived therefrom have shown promise as solvents and as plasticizers for resins and coating materials. Even more promising has been the use of these acids in the preparation of alkyd type resins. However, in most of these uses the quality of dicyclodiene dicarboxylic acids heretofore available has not been entirely satisfactory because of color producing tendencies. These have limited the usefulness of the acids particularly in resin formulations.

It has now been discovered that this undesirable property was due to traces of colored or color producing acidic impurities which were inherently formed in the heretofore available methods of synthesis. It has moreover been found that this difficulty can be essentially eliminated by controlling the hydrogen ion concentration of the aqueous solutions containing the disodium salt of the cyclodiene dicarboxylic acid. More specifically it has been discovered that a greatly improved product can be prepared when the third step of the above described synthesis, that is, the formation of the aqueous sodium salt solution from the organic mixture, is conducted in such a manner that the hydrogen ion concentration of the aqueous solution is maintained throughout this entire step at a pH value between about 3 and 7.5 and that the concentration of the salt in the resulting aqueous solution is kept between about 5 and 35 weight percent.

The required pH control is accomplished by addition of an inorganic or organic acid. Suitable mineral acids include hydrochloric, sulfuric, phosphoric acids, sulfur dioxide gas, as well as solid or gaseous carbon dioxide; suitable organic acids include acetic, halogenated acetic such as trichloroacetic, formic and other acids. The amount of acid required depends on the hydrogen ion concentration desired and on the procedure used for obtaining the free dicyclodiene dicarboxylic acid. The addition of essentially anhydrous acids, notably glacial acetic acid, was found to be especially outstanding and gave an essentially colorless dicarboxylic acid product. However, more dilute acetic acid as well as other acids such as sulfuric acid or carbon dioxide also resulted in products of greatly improved color as compared to those obtainable by conventional procedures.

In carrying out the present invention, several somewhat different procedures are available for obtaining the free acid. In the preferred procedure the organic reaction mixture which contains the disodium salt produced by carboxylation of the dienyl sodium is first mixed with an essentially anhydrous acid, notably glacial acetic acid, and the acidified organic mixture containing the sodium salt of the dicarboxylic acid is then mixed with water to form an aqueous solution of the salt at the preselected pH value. The amount of acid initially added to the organic mixture is such as to assure the proper hydrogen ion concentration when the sodium salt is subsequently being dissolved in water. The resulting aqueous salt solution is separated from the hydrocarbon portion of the original reaction mixture, and the aqueous solution is then further acidified with additional amounts of sulfuric or other appropriately strong acids of the type mentioned earlier herein, so as to spring the free dicarboxylic acid product. Since the latter is generally insoluble in water, it can be readily recovered from the aqueous sodium sulfate or similar solution by filtration.

As indicated above, the use of essentially anhydrous acid is preferred for the initial acidification of the organic reaction mixture. However, as a modification of the preferred procedure, one may use aqueous acetic acid as well as other acids such as aqueous sulfuric acid in the initial acidification step if some impairment of product quality can be tolerated. The superiority of an essentially anhydrous acid over acids containing appreciable amounts of free water appears to be due to the fact that the water present in the acid may cause temporary, premature precipitation of the water-insoluble dicarboxylic acid product from the organic solution when the aqueous acid is first added to the organic reaction mixture. While this precipitation usually is not of major significance, it may temporarily reduce the hydrogen ion concentration below the desired range and thereby impair ultimate product quality.

As another alternative, it is possible to mix the organic mixture containing the carboxylated sodium salt directly with water to form an aqueous solution of the salt, provided the water itself is preacidified with the proper amount of acid to assure that the aqueous salt solution is formed at the required pH value. Here again, however, there is some risk that the pH value may temporarily increase above the desired maximum while the aqueous salt solution is being formed and this may cause some impairment in product quality. Once the aqueous salt solution is formed, more acid is added to spring the free dicarboxylic acid product.

According to still another alternative, the organic reaction mixture containing the carboxylated sodium salt dissolved therein is contacted directly with a sufficient amount of dilute sulfuric acid to spring and precipitate all the dicarboxylic acid in a single step. The free dicarboxylic acid product is then removed from the hydrocarbons and the aqueous sodium sulfate solution by filtration. Of course, instead of using aqueous sulfuric acid, other aqueous acids such as acetic, trichloroacetic, formic, oxalic, etc. can be used similarly in the single step process.

When the preferred procedure described above is employed it is essential to form the aqueous solution of the carboxylated sodium salt from the organic reaction mixture at a pH between 5.8 to 7.5, preferably 5.8 to 6.8 or 7.0. The optimum hydrogen ion concentration range depends somewhat on the particular dicyclodiene dicarboxylic acid being prepared. For instance, in the case of dicyclopentadiene dicarboxylic acid, the optimum pH value is in the range of 5.8 to 6.8 or 7.0, whereas in the case of dimethyldicyclopentadiene dicarboxylic acid the preferred pH range is between 7.0 and 7.4. If the pH value is reduced below the indicated minimum, some of the dicyclodiene dicarboxylic acid tends to precipitate before separation of the hydrocarbon phase from the aqueous solution and thus complicates recovery, whereas going above the indicated maximum pH value results in an undue alkalinity which detracts from the full effectiveness of this invention. The particular pH range indicated can be obtained by adding a small amount of an organic acid such as acetic, trichloroacetic, etc. or an inorganic acid, such as sulfuric or phosphoric, to the organic solution of the disodium salt before the latter is dissolved in water. In the less preferred alternative, the indicated amount of acid can be added directly to the water before dissolving the carboxylated disodium salt therein. Still another effective way of maintaining the desired hydrogen ion concentration consists of saturating the water with $CO_2$, particularly under pressure ranging from 1 to 75 atm., preferably between 2 and 10 atm.

The amount of acid needed to provide the optimum hydrogen ion concentration generally will fall in the range of about 1 to 17 mole equivalents of strong acid per 100 moles of alkali metal used in the initial synthesis of the cyclodienyl salt. However, the actual optimum amount of acid needed will vary somewhat with the particular species of dicarboxylic acid being produced and the particular procedure followed, and is best determined by simple preliminary tests. More specifically, for instance, when preparing dicyclopentadiene dicarboxylic acid by the preferred procedure described above, it is desirable to add about 5 to 10 mole percent of acetic acid based on the amount of alkali metal in order to keep the pH of the aqueous phase between 5.8 and 6.8. On the other hand, the addition of about 13 to 17 mole percent of acetic acid based on the alkali metal is preferred in the preparation of dimethyldicyclopentadiene dicarboxylic acid when the pH value is to be kept in the optimum range between 7 and 7.4. Thus, although the optimum hydrogen ion concentration is somewhat higher for the dicyclopentadiene dicarboxylic acid than for its dimethyl homologue, the latter actually requires the addition of a somewhat larger amount of acid than the former. This seeming paradox is due to the fact that the dimethyldicyclopentadiene dicarboxylic acid is appreciably more soluble in organic solvents such as xylene than is the dicyclopentadiene dicarboxylic acid. Consequently, unlike in the case of the unsubstituted acid homologue, a substantial fraction of the dimethylated acid homologue remains in the organic phase when in contact with the acidified water and, as a result, relatively more extraneous acid must be present to maintain the acidity of the aqueous phase at the desired level.

The final springing of the free acid from the separated acidulated aqueous salt solution is then accomplished by adding enough strong acid to bring the final pH to about 3 to 4, e. g. add about 0.55 mole of sulfuric acid per mole of sodium.

When the aforementioned alternative is employed wherein the free acid is sprung directly from the organic solution more or less in a single step, the aqueous phase obtained after contacting all the disodium salt with the aqueous acid should have a pH between about 2 to 4, preferably 3 to 4. Thus, for instance one can add about 1.1 to 1.2 equivalents of sulfuric or other extraneous acid per total atoms of sodium present in the carboxylated salt, the acid being employed in dilute aqueous form, e. g. in a concentration of about 25 to 75 weight percent. Quite generally, however, this one-step, direct acidification procedure tends to give lower yields of the desired dicarboxylic acid product than the preferred method wherein the final acidification and springing of the essentially water-insoluble acid product takes place only after the hydrocarbon phase such as xylene solvent had been separated from the acid containing aqueous phase.

As indicated above, the invention is broadly useful in the preparation of free dicyclopentadiene dicarboxylic acids from organic dispersions containing an alkali metal salt of the acid suspended in an inert organic reaction medium such as xylene or a similar hydrocarbon diluent. More specifically, it is of particular interest in the preparation of dicyclopentadiene-3,7-dicarboxylic acid, from organic dispersions of its sodium salt which can be represented by the following formula:

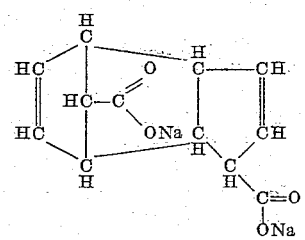

Of course, instead of using a sodium salt, it is equally feasible to use the corresponding salts of potassium. Likewise, in addition to dicyclopentadiene dicarboxylic acid proper, the invention can also be applied to the preparation of other dicyclopentadiene dicarboxylic acids such as dimethyl dicyclopentadiene dicarboxylic acid, i. e. the dicarboxylated dimer of methylcyclopentadiene, or methyl dicyclopentadiene dicarboxylic acid, i. e. the mixed dimer of cyclopentadiene carboxylic acid and methylcyclopentadiene carboxylic acid.

The inert solvents or dispersants in which the disodium salt of the dicyclodiene dicarboxylic acid is originally dispersed are those customarily employed in the synthesis of the intermediate cyclodienyl metal compound and more particularly in the carboxylation of the latter. For instance, the dispersant for the cyclodienyl sodium or carboxylated cyclodienyl sodium may be an inert aromatic or naphthenic compound such as xylene, toluene, benzene, cyclohexane, methylcyclohexane, etc.; or aliphatic materials such as heptane, hexane, light naphthas, straight run mineral spirits such as Varsol, mixtures of the foregoing, etc. In view of the technique normally employed in carrying out the synthesis, in which the dicarboxylated metal salt of the acid is prepared, it is generally advantageous that the dispersant boil above the melting point of the alkali metal used in making the initial cyclodienyl compound. Thus, inert $C_6$ and $C_8$ hydrocarbons boiling between about 110° and 165° C. are preferred, though those boiling below 110° C. can be used also, provided that the synthesis is carried out in pressure equipment. The end boiling point of the solvent is of no particular significance, except that hydrocarbons boiling above about 165° C. frequently are too viscous to permit easy manipulation. Furthermore, since the dicarboxylated sodium salt is usually converted into the free dicyclodienyl dicarboxylic acid at essentially atmospheric temperature, e. g. at 0° to 50° C., preferably at about 5° to 35° C., it will be understood that the boiling characteristics of the dispersant are normally determined primarily by the initial synthesis conditions, rather than by the requirements of the present invention as such. In fact, as far as the present invention is concerned, if any special reasons should make it desirable, it is possible to separate the dicarboxylated salt from the original dispersant and to redisperse it in a different organic medium prior to dissolving it in water; or even the separated, solid alkali metal salt can be dissolved in water directly. However, since exposure to air or oxygen at any stage of the synthesis tends to cause some discoloration of the final product, it is usually best to form the aqueous solution directly from the original organic slurry of the dicarboxylated dicyclodienyl salt.

The essence of the present invention, as applied specifically to the preparation of dicyclopentadiene dicarboxylic acid, can accordingly be illustrated and summarized by the following equations. First, the sodium salt of the dicarboxylated dicyclopentadiene is dissolved in water at a controlled hydrogen ion concentration:

(1)
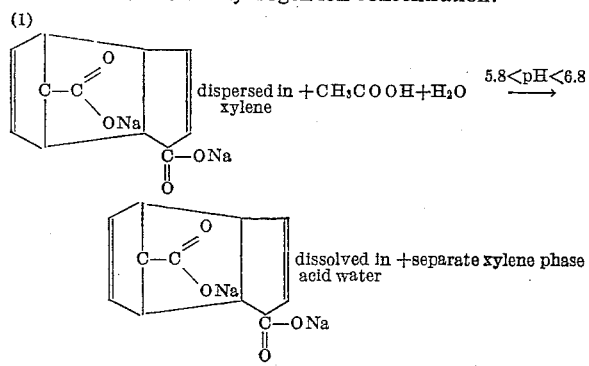

Following separation of the xylene phase from the aqueous salt solution, the free acid is sprung from the latter by further acidification:

(2)
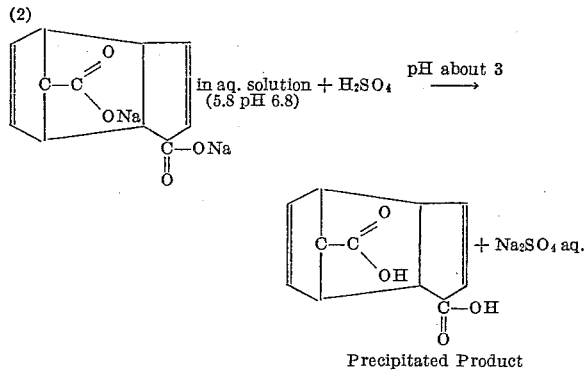

As indicated before, somewhat different hydrogen ion concentration are required in the preparation of other dicyclodiene dicarboxylic acid homologues.

Several specific examples will now be given for the purpose of illustrating the advantages of the invention and of further facilitating its practice by others. Of course, the invention is not limited to such examples.

In reading this specification and appended claims it will be understood that all amounts, proportions and percentages are expressed throughout on a weight basis unless indicated otherwise.

EXAMPLES

Table I summarizes the data pertaining to the preparation of the respective dicarboxylated dicyclodiene salt slurries which were subsequently treated in accordance with the present invention as summarized in Table II. In preparing these salt slurries, the cyclodiene monomer was reacted with finely divided sodium in the presence of the indicated amount of xylene diluent and about 0.05 mole percent of isopropyl alcohol based on the sodium used, whereupon the resulting cyclodienyl sodium slurried in the indicated amount of xylene was converted into the dicarboxylated salt by contact with carbon dioxide at the stated reaction conditions, all in accordance with previously described procedures. It will be noted that essentially the same type of material was prepared in each run, the only major difference being that cyclopentadiene monomer was used in runs 1–9, whereas methylcyclopentadiene monomer was used in runs 10–12.

Table II summarizes the essence of the invention in that it contains data relating to the preparation of the free dicyclodiene dicarboxylic acid from the corresponding sodium salt slurries at various hydrogen ion concentrations obtained, as indicated, either by adding the required amount of anhydrous acid to the organic slurry prior to mixing with water, or by adding the organic slurry to pre-acidified water. It will be understood that the slurry obtained in any given run shown in Table I was treated in the similarly numbered run of Table II. The yield and acid number of the various acid products was determined and their quality measured in terms of Gardner color. It will be understood that essentially colorless or light colored products are desired. For practical purposes, this requirement is well met by products having a Gardner color rating of 1 or 1½. Products having a rating of about 2 to 2½ are fair, whereas those having a still higher rating are too dark to be satisfactory for many purposes, such as the preparation of light alkyd resins.

*Table I.—Cyclodienyl sodium preparation and carboxylation*

| Run No. | Cyclodiene Used | Cyclodienyl Sodium Preparation | | | Carboxylation [c] | | | |
|---|---|---|---|---|---|---|---|---|
| | | Na, g. moles | Cyclodiene, g. moles | Xylene, ml. | Xylene, ml. | Temp., °C. | $CO_2$ Pressure | Time, Min.[d] |
| 1 | CPD [a] | 4.0 | 4.8 | 1,200 | 1,000 | −30 to −20 | atm | 90 |
| 2 | CPD [a] | 1.5 | 1.8 | 600 | 1,000 | −20 | atm | 75 |
| 3 | CPD [a] | 1.5 | 1.8 | 600 | 1,000 | −25 | atm | 45 |
| 4 | CPD [a] | 1.5 | 1.8 | 600 | 1,000 | −25 | atm | 45 |
| 5 | CPD [a] | 4.0 | 4.8 | 1,200 | 1,000 | −30 | atm | 90 |
| 6 | CPD [a] | 1.5 | 1.8 | 600 | 1,000 | −20 | atm | 75 |
| 7 | CPD [a] | 1.5 | 1.8 | 600 | 1,000 | −20 | atm | 75 |
| 8 | CPD [a] | 1.5 | 1.7 | 750 | 1,000 | −20 | atm | |
| 9 | CPD [a] | 2.0 | 2.3 | 600 | 1,000 | −25 | atm | 45 |
| 10 | MCPD [b] | 1.5 | 1.8 | 600 | 1,000 | +5 | atm | 120 |
| 11 | MCPD [b] | 1.5 | 1.8 | 600 | 1,000 | −20 | atm | 90 |
| 12 | MCPD [b] | 1.5 | 1.55 | 600 | 1,000 | −20 | atm | 90 |

[a] CPD = cyclopentadiene monomer.
[b] MCPD = methylcyclopentadiene monomer.
[c] Carboxylation carried out by adding cyclodienyl sodium dispersed in xylene to xylene saturated with $CO_2$ at essentially atmospheric pressure.
[d] Time used to add cyclodienyl sodium to carboxylation vessel.

Table II.—Effect of pH level on acid product quality

| Run No. | Salt Solution [a] | | Acid Used for Controlling pH | Equivalents of Acid Used, Mole Percent [b] | Dicyclodiene Dicarboxylic Acid | | | Gardner Color of Acid [d] |
|---|---|---|---|---|---|---|---|---|
| | pH | Temp., °C | | | Type | Yield, Mole Percent [b] | Acid No., meq./gm. [c] | |
| 1 | [i] 7.5 | 25 | none | none | DCPD [m] | 90 | 8.90 | 6. |
| 2 | [i] 8.7 | 5–10 | ___do___ | none | DCPD [m] | 88.2 | 9.08 | 3½. |
| 3 | 6.6 | 25 | Glac. Acetic [j] | 6.3 | DCPD [m] | 87.5 | 9.06 | 1. |
| 4 [f] | 6.3 | 25 | ___do___ | 8.6 | DCPD [m] | 86.0 | 9.06 | 1. |
| 5 | 6.5 | 25 | ___do___ | 6.6 | DCPD [m] | 92.1 | 9.04 | 1. |
| 6 | 6.5 | 25 | Glac. H$_2$SO$_4$ [k] | 5.0 | DCPD [m] | 88.5 | 9.01 | 1½. |
| 7 | 6.9 | 25 | CO$_2$ [l] | | DCPD [m] | 91.8 | 9.06 | 2. |
| 8 [g] | 3.0 | 40 | H$_2$SO$_4$ [g] | 110 | DCPD [m] | 60.0 | 9.01 | 2. |
| 9 [h] | 6.3 | 25 | Glac. Acetic [j] | 7.3 | DCPD [m] | [h]67.5 | 9.07 | colorless.[h] |
| 10 | 7.6 | 25 | ___do___ | 6.3 | DiMeDCPD [n] | 87.7 | 7.90 | very yellow. [o] |
| 11 | 7.5 | 25 | ___do___ | 12.7 | DiMeDCPD [n] | 89.6 | 7.68 | light yellow. [o] |
| 12 | 7.4 | 25 | ___do___ | 17.0 | DiMeDCPD [n] | 94.2 | 7.85 | white. [o] |

[a] Disodium salt concentration ranged from about 21 to 26 wt. percent in water. pH measured at room temperature. Temperatures indicated are the temperatures of the aqueous solutions immediately after all the carboxylated cyclodienyl sodium was dissolved.

[b] Mole percent on sodium charged to original synthesis.

[c] Theoretical acid no. for first nine runs 9.08 meq./gm. For last three runs 8.06 meq./gm.

[d] Color test consists of making up a 20 wt. percent aqueous disodium salt solution of dicyclopentadiene dicarboxylic acid at pH 7.

[f] Water was added to carboxylation vessel containing carboxylated cyclodienyl sodium dispersed in xylene. In the other runs the carboxylated cyclodienyl sodium dispersed in xylene is added to vessel containing water.

[g] Carboxylated cyclodienyl sodium added to water containing 110 mole percent (based on sodium) of sulfuric acid to spring all the dicyclopentadiene dicarboxylic acid.

[h] Yield and color obtained on acid after treating same with 15 wt. percent adsorbent char in hot absolute methanol to remove any color and/or color producing impurities remaining during the synthesis.

[i] Difference in pH is due to the removal of all the dissolved CO$_2$ in xylene, in Run No. 2, prior to passing xylene phase containing dispersed carboxylated cyclodienyl sodium into vessel containing water. In Run No. 1 sufficient amount of CO$_2$ remained dissolved in the xylene phase to give the resulting aqueous disodium salt solution of the dicyclopentadiene dicarboxylic acid a pH of 7.5.

[j] Acetic acid added to xylene containing dispersed carboxylated cyclodienyl sodium. After about three minutes waiting the carboxylated cyclodienyl sodium was dissolved in water.

[k] Sulfuric acid added to water prior to dissolving carboxylated cyclodienyl sodium in same.

[l] Disodium salt solution of dicyclopentadiene dicarboxylic acid was kept saturated with CO$_2$ at room temperature and essentially atmospheric pressure as the xylene containing dispersed carboxylated cyclodienyl sodium was being added to the water. Final salt concentration 21 wt. percent.

[m] DCPD—dicyclopentadiene.

[n] DiMeDCPD—dimethyldicyclopentadiene.

[o] Color of solid dimethyldicyclopentadiene dicarboxylic acid. Gardner test could not be used because pH>7 is required to dissolve all dimethyldicyclopentadiene dicarboxylic acid.

As indicated in Table II, a hydrocarbon slurry containing about 190 to 500 grams of the dicarboxylated disodium salt is conveniently used as the starting material. This salt is present in the slurry or dispersion in a concentration of about 10 to 25 wt. percent, e. g. 12 to 21 weight percent in xylene. This dispersion is mixed with water, with or without added acid as indicated, to form an aqueous solution containing the salt in a concentration of about 21 to 26 percent, i. e. with about 46 to 100 grams of water per 100 grams of initial dispersion. The resulting aqueous solution is separated from the hydrocarbon phase. Finally, except in the single-step procedure illustrated by run No. 8, the aqueous solution is acidified to a pH of 3 to 4 by adding additional amounts of acid to spring the desired dicarboxylic acid product therefrom. The solid acid, being essentially insoluble in water, is recovered by filtration, washed several times with small amounts of water and then dried by conventional methods.

The data shown in Table II lead to the following conclusions. As indicated by runs No. 1 and 2, which are illustrative of the prior art, the alkaline pH which normally results when the alkali metal salt is dissolved in water leads to acid products relatively dark in color. Although the pH value was less favorable in run No. 2 than in run No. 1, product No. 2 was actually somewhat better than product No. 1, due to the somewhat lower temperature at which the salt solution was formed in run No. 2.

The products obtained by first acidifying the organic salt slurry with the required amount of glacial acetic acid were consistently good as indicated by runs 3, 4, 5, 9, 11, 12. The product of run No. 10 was not satisfactory, due to insufficient acid addition.

The alternative procedure wherein the acid was added directly to the water, rather than to the organic salt slurry, also gave acceptable products, particularly as shown in run No. 6. The color of products No. 7 and 8 was still fairly light but less satisfactory, in the former case due to the relatively high pH value of 6.9, and the latter case due to the single-step technique and the resulting high temperature. Note also that the single-step technique of run No. 8 reduced the product yield quite considerably.

A comparison between runs 1 and 12 illustrates to what extent the optimum pH level depends on the specific dicyclodiene acid being prepared. As described earlier herein the unsubstituted acid requires appreciably higher hydrogen ion concentrations than the dimethylated homologue.

Having described the invention, its scope is particularly pointed out in the appended claims, especially when read with reference to and in the spirit of the foregoing description and the state of the art.

What is claimed is:

1. In a process for producing a dicyclopentadiene dicarboxylic acid wherein a finely divided alkali metal is reacted with a cyclopentadiene hydrocarbon to form a cyclopentadienyl metal compound, and said cyclopentadienyl metal compound is contacted with an excess of carbon dioxide in an inert liquid hydrocarbon medium to form a dispersion of an alkali metal salt of said dicyclopentadiene dicarboxylic acid, the improvement which comprises mixing said hydrocarbon dispersion of the alkali metal salt with sufficient water to form an aqueous solution of between about 5 and 35 weight percent of said salt in the presence of sufficient added acid to maintain the hydrogen ion concentration of the resulting mixture at a pH value between 5.8 and 7.5, separating the hydrocarbon phase from the aqueous phase, adding enough strong acid to the aqueous phase to convert the dicarboxylic acid salt into water-insoluble acid, and separating the free dicyclopentadiene dicarboxylic acid from the aqueous phase.

2. A process according to claim 1 wherein the dicarboxylic acid is the unsubstituted dicyclopentadiene dicarboxylic acid and wherein the pH value is kept between 5.8 and 7 while forming the aqueous salt solution.

3. A process according to claim 1 wherein the dicarboxylic acid is dimethyl dicyclopentadiene dicarboxylic acid and wherein the pH value is kept between 7 and 7.5 while forming the aqueous salt solution.

4. A process according to claim 1 wherein the alkali metal is sodium.

5. A process according to claim 4 wherein the added acid present in the mixing step for purposes of pH control is glacial acetic acid and is added to the hydrocarbon dispersion of the salt before the dispersion is mixed with water.

6. A process according to claim 4 wherein the added acid present in the mixing step for purposes of pH control is sulfuric acid and is added directly to the water.

7. A process according to claim 4 wherein the acid present in the mixing step is added in the form of carbon dioxide.

8. A process according to claim 4 wherein the cyclic pentadiene hydrocarbon is selected from the group consisting of cyclopentadiene and methylcyclopentadiene, and wherein the improvement comprises mixing the said hydrocarbon dispersion of the alkali metal salt with sufficient water to form an aqueous solution of between about 5 and 35 weight percent of said salt in the presence of 5 to 17 mole equivalents, based on 100 moles of the alkali metal originally charged, of an acid compound selected from the group consisting of acetic and sulfuric acid, so as to maintain the hydrogen ion concentration of the water phase at a pH between about 5.8 and 7.0 in the case of the cyclopentadiene acid and between 7.0 and 7.5 in the case of the methylcyclopentadiene acid, separating the resulting aqueous salt solution from the residual hydrocarbon phase, and further adding a mineral acid to said aqueous salt solution in an amount sufficient to form and precipitate free dicyclopentadiene dicarboxylic acid therefrom.

9. A process according to claim 8 wherein the required hydrogen ion concentration is obtained in the mixing step by adding said acid compound to the water prior to mixing with the hydrocarbon dispersion of the salt.

10. A process according to claim 4 wherein the improvement comprises mixing the said hydrocarbon dispersion with sufficient water to form an aqueous solution of between about 5 and 35 weight percent of said salt in the presence of 3 to 17 mole equivalents, based on 100 moles of the alkali metal originally charged, of a strong acid so as to obtain an aqueous phase having a pH value of about 5.8 to 7.5 and thereafter acidifying the aqueous phase separated from a hydrocarbon phase with the strong acid to a pH between about 3 to 4 to thereby precipitate the dicyclopentadiene dicarboxylic acid.

11. In a process for producing a dicyclopentadiene dicarboxylic acid wherein finely divided sodium is reacted with a cyclopentadiene hydrocarbon selected from the group consisting of cyclopentadiene and methylcyclopentadiene, to form a cyclopentadienyl metal compound, and said cyclopentadienyl metal compound is contacted with an excess of carbon dioxide in an inert liquid hydrocarbon medium to form a dispersion of an alkali metal salt of said dicyclopentadiene dicarboxylic acid, the improvement which comprises mixing the said hydrocarbon dispersion of the salt first with 5 to 17 mole equivalents, based on 100 moles of the alkali metal originally charged, of glacial acetic acid, and then with sufficient water to form an aqueous solution of between about 5 and 35 weight percent of said salt, so as to maintain the hydrogen ion concentration of the water phase at a pH between about 5.8 and 7.0 in the case of the cyclopentadiene acid and between 7.0 and 7.5 in the case of the methylcyclopentadiene acid, separating the resulting aqueous salt solution from the residual hydrocarbon phase, and further adding a mineral acid to said aqueous salt solution in an amount sufficient to form and precipitate free dicyclopentadiene dicarboxylic acid therefrom.

References Cited in the file of this patent

UNITED STATES PATENTS

| 2,716,662 | Cohen et al. | Aug. 30, 1955 |

FOREIGN PATENTS

| 524,487 | Belgium | May 21, 1954 |
| 924,752 | Germany | Mar. 7, 1955 |